(12) United States Patent
Torgersen

(10) Patent No.: US 7,418,985 B2
(45) Date of Patent: Sep. 2, 2008

(54) HYDRAULIC PRUNING ATTACHMENT

(76) Inventor: Tim Torgersen, P.O. Box 1035, Davenport, FL (US) 33836

( * ) Notice: Subject to any disclaimer, the term of this patent is extended or adjusted under 35 U.S.C. 154(b) by 77 days.

(21) Appl. No.: 11/532,379

(22) Filed: Sep. 15, 2006

(65) Prior Publication Data
US 2008/0066827 A1 Mar. 20, 2008

(51) Int. Cl.
*A01D 34/43* (2006.01)
*A01G 23/08* (2006.01)

(52) U.S. Cl. .............. 144/4.1; 56/17.1; 56/235

(58) Field of Classification Search ............ 144/4.1, 144/34.1; 56/10.1, 10.6, 10.7, 11.9, 13.5, 56/14.7, 16.7, 17.1, 234, 235, 289, 290, 295; 83/471.1, 928
See application file for complete search history.

(56) References Cited
U.S. PATENT DOCUMENTS

| | | | | | |
|---|---|---|---|---|---|
| 2,404,655 A | * | 7/1946 | Randall | ............... | 30/371 |
| 2,577,906 A | * | 12/1951 | Miller et al. | ............... | 30/379 |
| 2,624,380 A | * | 1/1953 | Haynes | ............... | 30/379 |
| 2,661,035 A | * | 12/1953 | Ryals | ............... | 30/379 |
| 2,940,486 A | * | 6/1960 | Whitmore | ............... | 83/490 |
| 3,157,016 A | * | 11/1964 | Leydig et al. | ............... | 56/235 |
| 3,192,695 A | * | 7/1965 | Leydig et al. | ............... | 56/235 |
| 3,487,615 A | * | 1/1970 | Langford et al. | ............... | 56/235 |
| 4,592,398 A | * | 6/1986 | Golob et al. | ............... | 144/4.1 |
| 4,887,417 A | * | 12/1989 | Parsons, Jr. | ............... | 56/15.2 |
| 5,430,999 A | * | 7/1995 | Grant | ............... | 56/11.9 |
| 6,085,505 A | * | 7/2000 | Edwards | ............... | 56/15.2 |

* cited by examiner

Primary Examiner—Shelley Self
(74) Attorney, Agent, or Firm—Allen Dyer Doppelt Milbrath & Gilchrist, P.A.

(57) ABSTRACT

A saw attachment for pruning trees, shrubs and undergrowth that can be used on a hydraulic vehicle, having auxiliary line connections for accepting attachments. The attachment has cutting blades located at the ends of a swing arm, which is mounted on a plate capable of holding a single, fixed angle of orientation from 0° to 90° with respect to the imaginary plane of the direction of travel of the vehicle. Depending on the type of host vehicle on which the attachment is used, the attachment can be mounted using either a connector plate or an articulated extension arm.

11 Claims, 10 Drawing Sheets

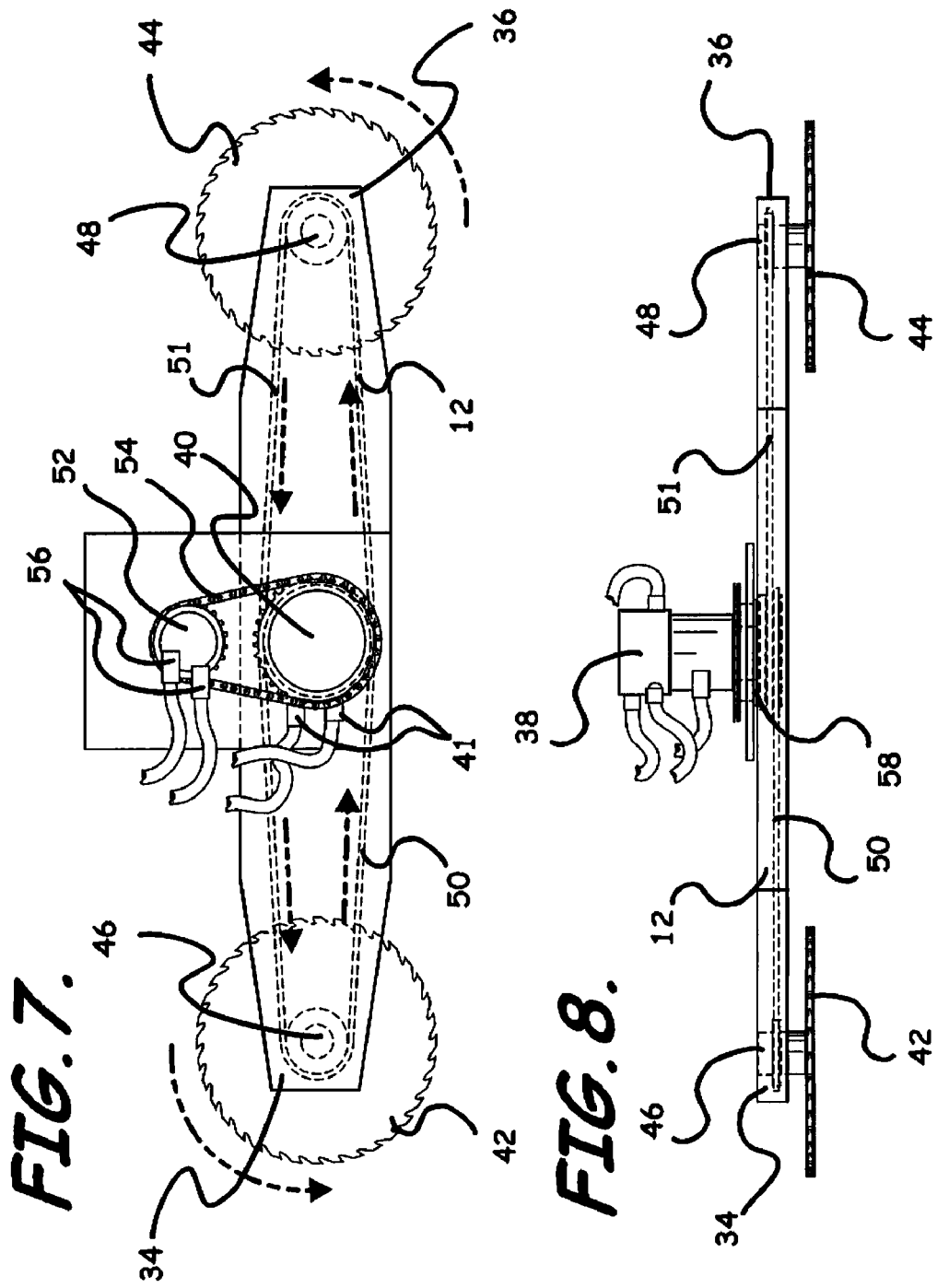

HYDRAULIC PRUNING ATTACHMENT

FIELD OF THE INVENTION

This invention relates to an apparatus for use with landscaping equipment and, more specifically, to a pruning attachment that may be connected to working end of a hydraulic machine, such as a front-end loader or a back-hoe, that has auxiliary hydraulic line connections for such attachments.

BACKGROUND OF THE INVENTION

Existing industrial hedgers and cutting tools are typically single purpose vehicles that include either a single cutting blade or a plurality of cutting blades that are fixed to either a stationary or a rotating cutting blade arm. These hedgers operate in a single or at most two planes. As a result, such hedgers are limited as to the types of operations they can perform. Where multiple operations are contemplated, the operator is required to change either an attachment or the orientation of the blades. For example, U.S. Pat. No. 2,404,655 to Randall, dated Jul. 23, 1946, describes a Machine for Felling Trees. This machine provides two saws, one mounted horizontally and the other mounted vertically. The horizontal blade is used for felling trees, whereas the vertical blade is used for cutting the felled trees into logs. The two blades are not mounted on the same bearing member and cannot be used concurrently.

A Dec. 11, 1951 patent issued to Miller et al. for Tractor Mounted Brush Saw, U.S. Pat. No. 2,577,906 identifies a machine having two or more saws mounted on a frame positioned at the front end of a tractor. The saws are operated by individual power units, so that the speed of each can be varied independently.

Similarly, U.S. Pat. No. 2,624,380 for Brush Saw to L. N. Haynes, dated Jan. 6, 1953, has two saw blades that are carried forward of the front end of a tractor. Although each saw blade assembly may be tilted upwardly from a horizontal position, there appears to be no structure which would allow for the blades to be positioned alongside the tractor.

Vertically-Adjustable Tree-Felling Tractor Mounted Saw was issued to Ryals on Dec. 1, 1953, as U.S. Pat. No. 2,661,035. This invention describes a saw blade apparatus attached to the front end of a tractor. The assembly includes a frame that allows the single blade to be raised or lowered and to be moved sideways from one front corner of the tractor to the opposite front corner. The structure of this invention does not permit the blade to be moved to the side of the tractor or to be tilted from the horizontal to the vertical.

Whitmore obtained U.S. Pat. No. 2,940,486 on Jun. 14, 1960, for Pruning Apparatus. This invention is permanently mounted, and is not adapted as an attachment. The Whitmore machine also appears not to be capable of lowering the saw blade bearing arm to ground level with the blades in a horizontal orientation. The downwardly movement of the saw blade arm is limited by the height above ground of the trailer frame. Accordingly, this machine does not appear capable of orienting the saws so that they are at ground level.

U.S. Pat. No. 3,157,016 was granted on Nov. 17, 1964, to Leydig et al. for a Tree Topper With Reciprocating Cutter Boom. This machine, includes an articulated boom which carries a cutter arm having multiple saw blades. The cutter arm is raised and extended from the front of a self-propelled vehicle, such as a tractor, however the cutting apparatus is not an add-on that can be adapted to various vehicles. Additionally, in the Leydig invention the cutting apparatus is carried on the front of the vehicle and, is not borne laterally on the vehicle and thus would be unable to prune the lower sides of hedges.

A second patent was issued on Jul. 6, 1965, to Leydig as U.S. Pat. No. 3,192,695 for Tree Trimming Machine Or the Like. This machine is somewhat different from that of the previous Leydig patent, but is also a dedicated piece of equipment rather than an attachment adaptable to various vehicles. The cutter arm in this machine is capable of trimming bushes in a direction lateral to the direction of travel of the machine on the side of the vehicle. The cutting arm may also be tilted, but appears incapable of being extended to ground level.

A third patent to Leydig et al., U.S. Pat. No. 3,487,615 dated Jan. 6, 1970 is for Double-Boom Hedger. This is an interesting machine in which the vehicle resembles a bulldozer having two cutting arms connected forward of the vehicle. The cutting arms hydraulically extend upwardly, and may also be deployed laterally from the vehicle; however, the cutting arms cannot be tilted sufficiently to reach ground level.

U.S. Pat. No. 4,592,398 was issued on Jun. 3, 1986, to Golob et al. for Continuous Tree Harvestor [sic]. This invention appears directed to the cutting, harvesting and bundling of small trees such as Christmas trees. The cutting apparatus is positioned along the front of the vehicle and at relatively close to ground level but does not have the capability of being turned sideways relative to the vehicle.

Grant received U.S. Pat. No. 5,430,999 on Jul. 11, 1995, for Tree Trimming And Pruning Machine. This invention provides a cutting arm bearing multiple saw blades. The cutting arm is extendable hydraulically to reach the tops of trees and the blades may be turned so as to be oriented horizontally, However this machine cannot cut a vertical swath beside the vehicle as the hydraulic arm extends only directly ahead of the vehicle and not beside it.

Industrial Vehicle With Adjustable Boom Members to Edwards, U.S. Pat. No. 6,085,505, dated Jul. 11, 2000, describes a machine that is dedicated to cutting and is not an attachment for a pre-existing vehicle. Saw blades are borne on a hydraulically extendable boom and the cutting arm includes a pivot linkage that allows the blades to be turned from a vertical alignment to a horizontal alignment allowing the topping of trees.

SUMMARY OF THE INVENTION

With the foregoing in mind, the present invention advantageously provides a saw attachment, rather than a dedicated vehicle, having cutting blades mounted on an elongated cross-arm member that may be oriented horizontally, vertically and at any angle therebetween relative to the direction of travel so that topping, trimming, cutting, and brush removal may all be accomplished using a single piece of equipment that can be attached to the working end of a front-end loader, a back-hoe or any other piece of industrial machinery, referred to herein as a host vehicle. In the preferred embodiment, the host vehicle will have connections for accepting hydraulic attachments.

The invention commonly includes a base plate on which is mounted the base unit of a pivot plate hydraulic cylinder, the base plate is pivotally connected to a pivot plate to which a working end of the pivot plate hydraulic cylinder is also connected. Attached to the underside of the pivot plate is a swing arm which is carried on a rotatable connection, such as a pivot or axle, so that it is capable of turning through 180° of arc relative to the connection. The swing arm has at either end along its lengthwise extent a circular saw blade that is also borne on a mechanical rotatable connection that is driven by a belt or chain-drive mechanism located inside the swing arm that rotates the circular saw blades. The mechanism is driven by a swing arm motor mounted on the pivot plate and hydraulically connected to the rotatable connection of the swing arm. However, those skilled in the art will recognize that the invention could work equally well with an electrical swing arm motor driven from connections to the battery of the host vehicle.

In a first embodiment this saw attachment assembly is connect able to a hydraulic host vehicle, such as a Bob Cat™ or a front-end loader, by replacing the bucket of those vehicles with an extension assembly that is slidably connected to the connector plate. The extension assembly has a hydraulic cylinder actuator that can be used to slide the support plate to the side of the connection plate. This attachment will properly be completed by the addition of a safety guard that attaches to the arm on either blade, or across the length of the entire arm.

In an alternative embodiment, the base plate, pivot plate and swing arm having two circular saw blades are mounted laterally at the terminal end of an articulated, hydraulic extension arm. The hydraulic extension arm is attached to the working end of a back-hoe in place of its shovel.

In the specification there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification and as defined in the appended claims.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which:

FIG. 7 is a top-down view of the swing arm showing how a chain or belt drive is used to rotate the circular saw blades about their point of connection according to an embodiment of the present invention;

FIG. 8 is an edge-on view showing how a chain or belt drives used to rotate the circular saw blades are oriented about the rotatable point of connection within the swing arm according to an embodiment of the present invention;

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

Figure 1:
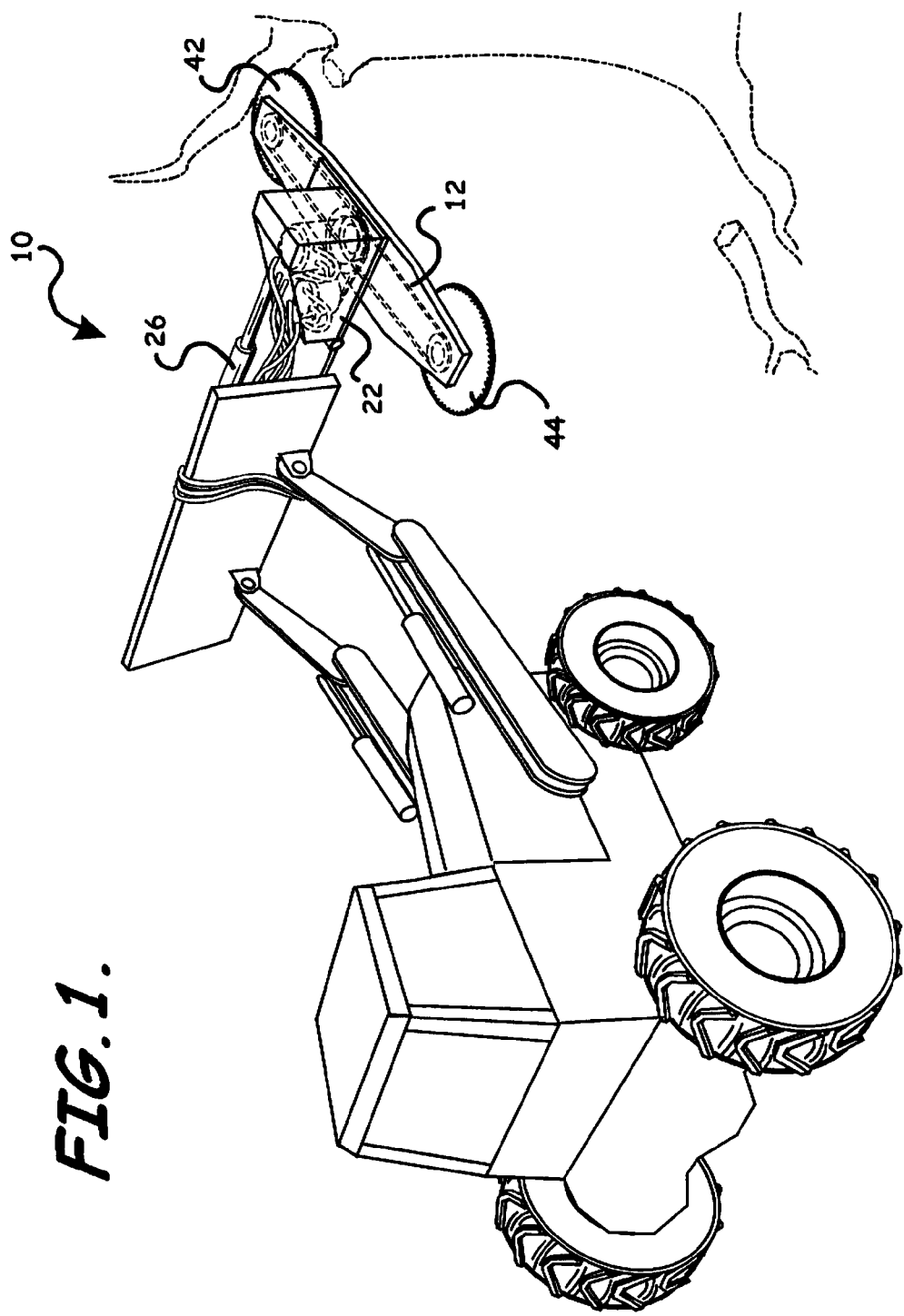
FIG. 1 is a view of a front-end loader in which the saw attachment has replaced the bucket so that the saw attachment takes advantage of the front-end loader's ability to raise the saw attachment to the height of a tree's limbs, demonstrating how the attachment can be used to trim a tree according to an embodiment of the present invention.
Figure 2:
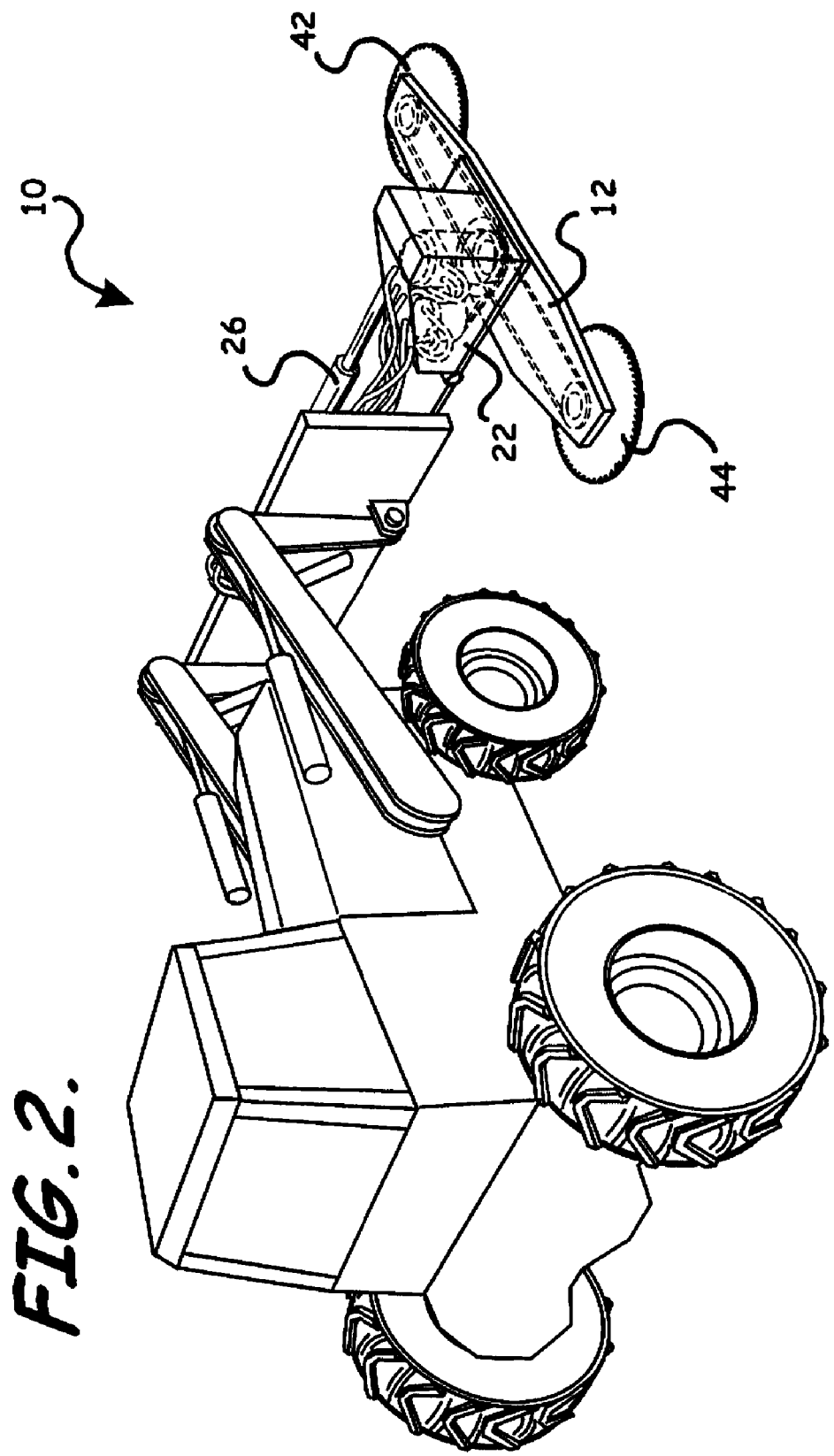
FIG. 2 is a view of a front-end loader to which the apparatus has been attached showing the orientation of the saw attachment at ground level to trim brush from underneath hedges according to an embodiment of the present invention.

FIG. 1 depicts a saw attachment 10 that can be used on a host vehicle, such as a tractor, front-end loader, or Bob Cat™, or any other piece of hydraulically operated equipment having connections for such attachments. As shown in FIG. 1, the standard bucket attachment of the host vehicle is replaced by a saw attachment 10. FIG. 2 provides a view of a host vehicle showing how the saw attachment 10 is used at ground level to cut down a small tree or to remove brush or undergrowth.

Figure 3:
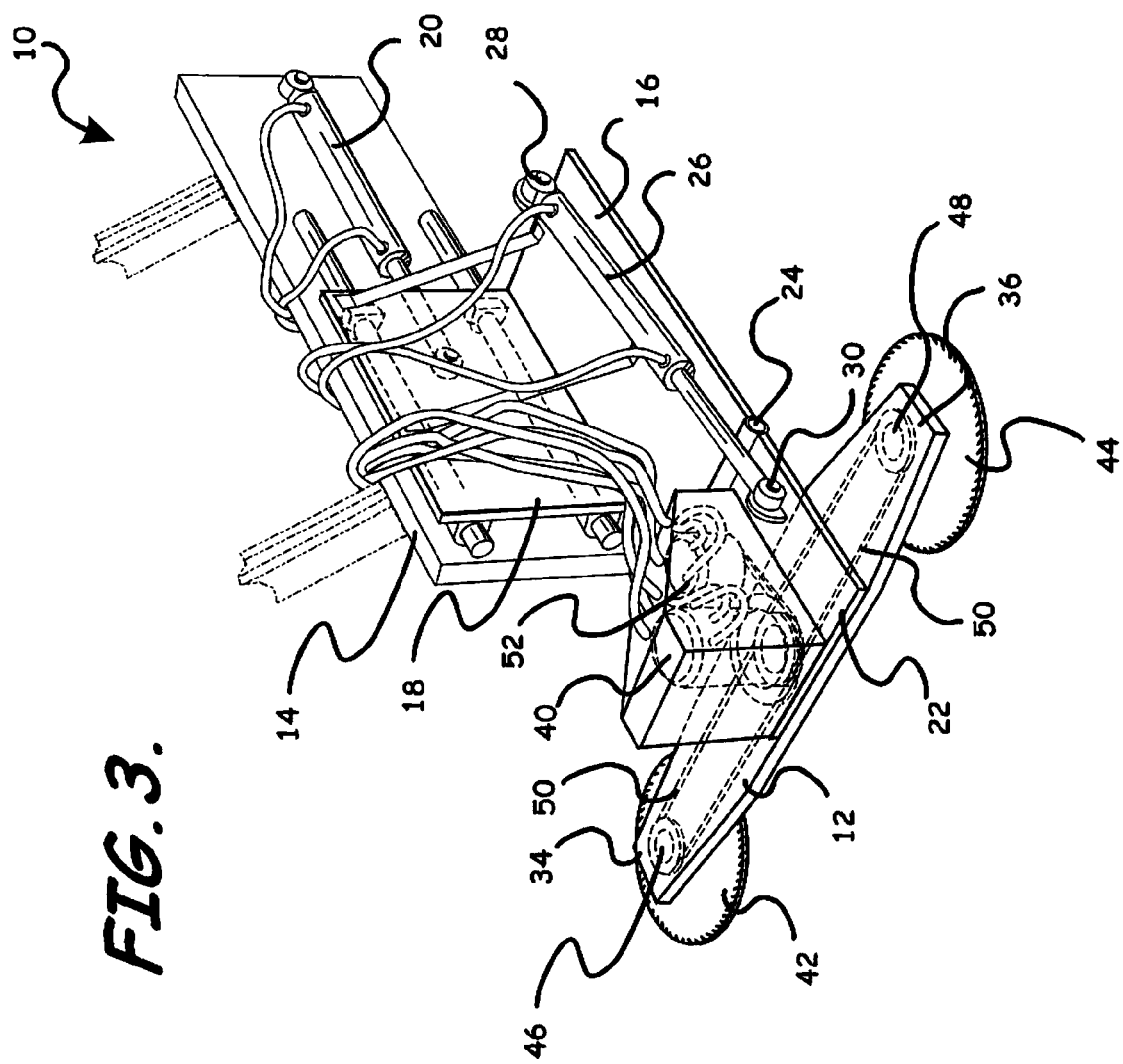
FIG. 3 is a view illustrating how the components of a saw attachment according to an embodiment of the present invention.
Figure 4:
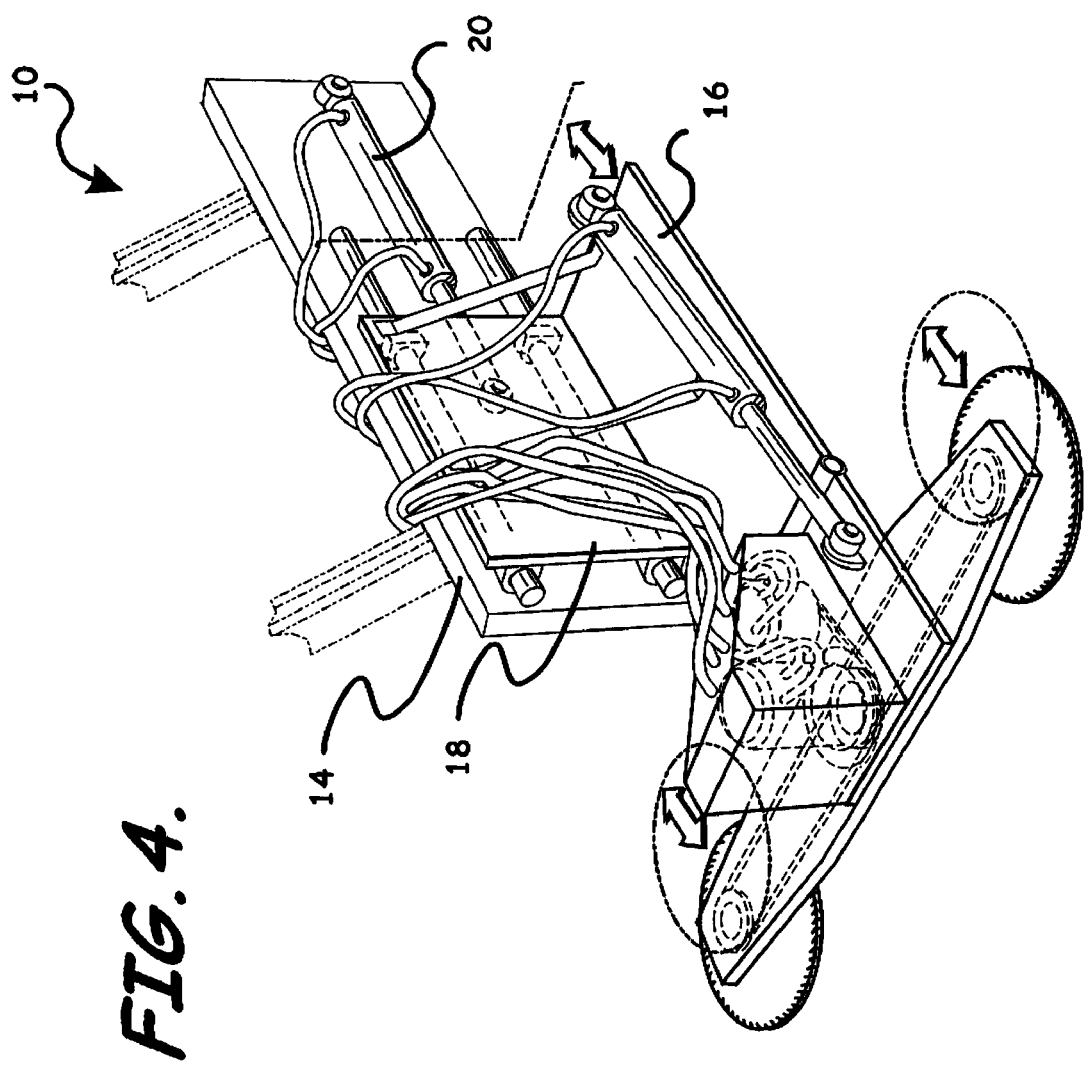
FIG. 4 is a view showing the movement of an hydraulic cylinder actuator causes an extension assembly to move laterally with respect to a connector plate so that the proximity of the saw attachment to a host vehicle is affected according to an embodiment of the present invention.

A view showing the elements of the saw attachment 10 is provided in FIG. 3, which shows a connector plate 14 that may be substituted in place of a bucket attachment on the front end of a host vehicle. Extending outwardly along an imaginary plane substantially perpendicular to the connector plate 14 and horizontal with respect to the host vehicle is a support plate 16. An extension assembly 18 slidably connects the support plate 16 to the connector plate 14, and has a hydraulic cylinder actuator 20 operable to slide said support plate 16 laterally outward from the host vehicle relative to said connector plate 14. FIG. 4 further illustrates that when the hydraulic cylinder actuator 20 is engaged, the hydraulic extension assembly 18 is moved laterally out from the connector plate 14, which has the affect of moving the entire saw attachment away from or into an imaginary plane defined by the direction of travel of a host vehicle.

Figure 5:
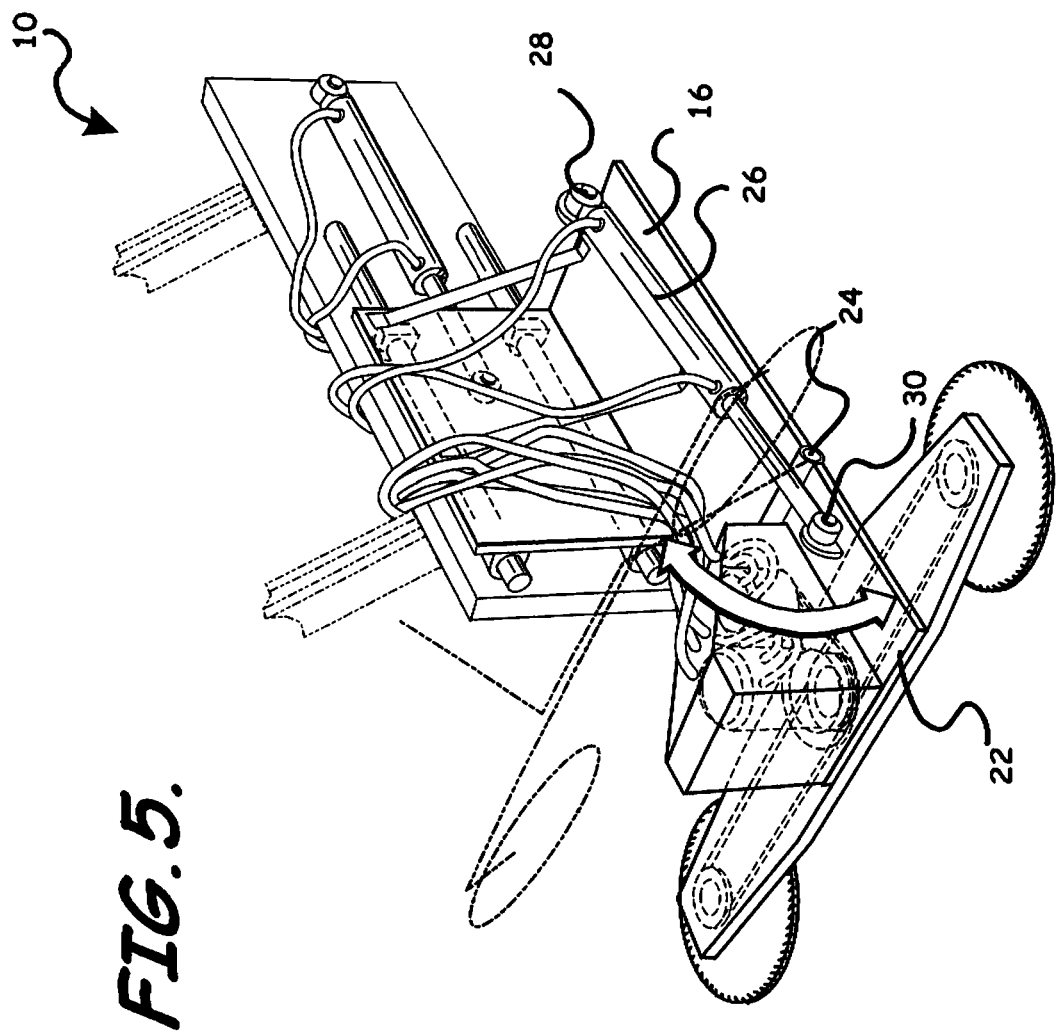
FIG. 5 is a view of the apparatus illustrating how the hydraulic cylinder residing on the support plate and pivot plate can be used to set the angle of a swing arm and saw blades from a horizontal orientation through 90 degrees to a vertical orientation according to an embodiment of the present invention.

Along a lateral periphery of the support plate 16 is a pivot plate 22 that is connected to the support plate by a pivot or hinge 24. A pivot plate hydraulic cylinder 26 is mounted at a base end 28 to the support plate and is mounted at its working end 30 to the pivot plate 22. The pivot plate hydraulic cylinder 26 permits the pivot plate 22 to be moved through 90° of arc relative to the support plate 16 so that the orientation of a swing arm 12 mounted to the lower side of the pivot plate 22 may be oriented at the proper angle for the work to be performed. As illustrated in FIG. 5, the movement of the pivot plate 22 is controlled by the compression of the pivot plate hydraulic cylinder 26 so that the pivot plate may be held at a single, fixed angle, either horizontal, vertical or at any angle in between, during operation. This allows the saw blades to travel at a uniform cutting height with respect to the ground, thus maintaining a uniform cutting.

Figure 6:
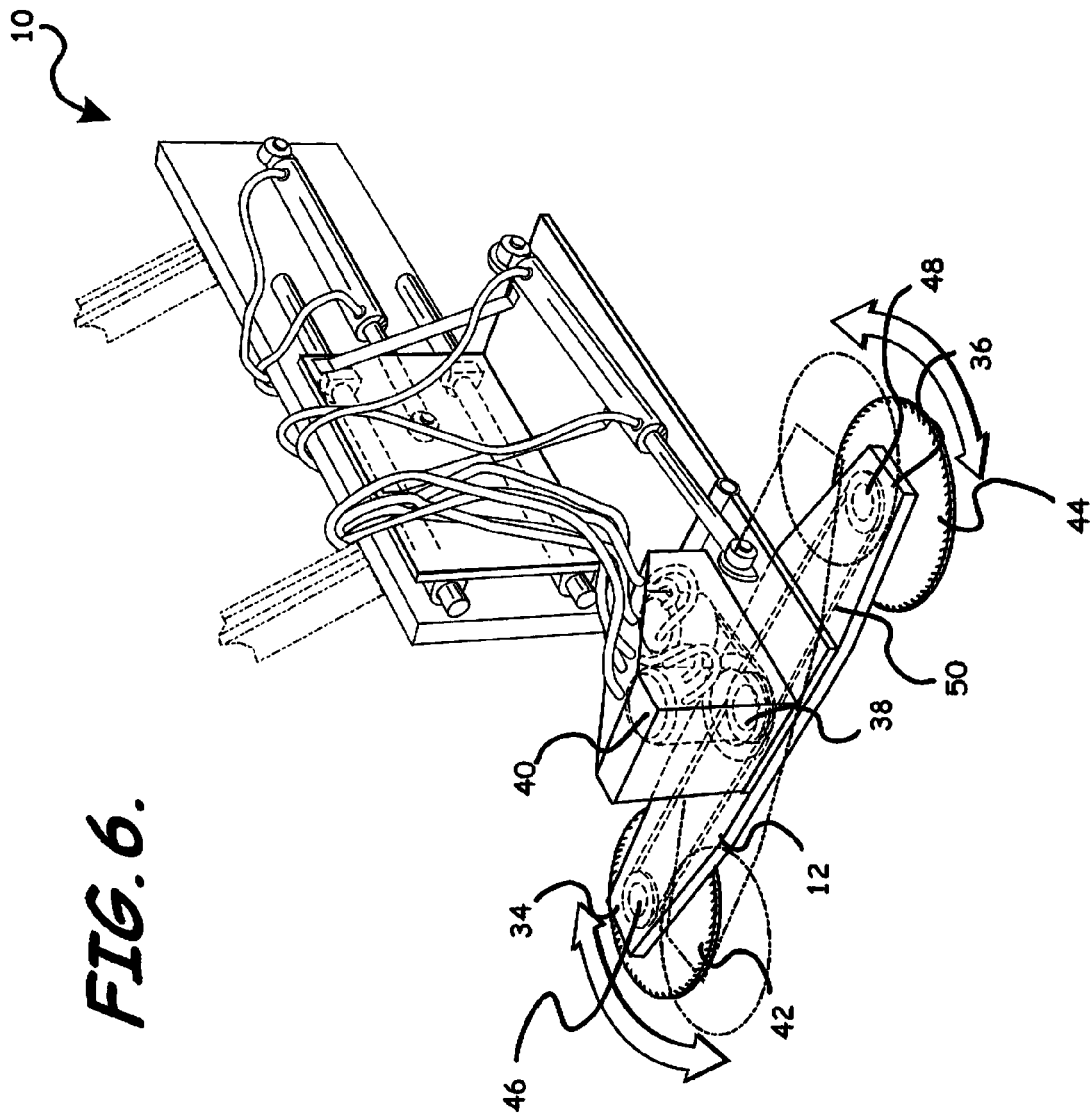
FIG. 6 is a view of the apparatus showing how the swing arm can be rotated through approximately 180° relative to its point of connection according to an embodiment of the present invention.
Figure 9:
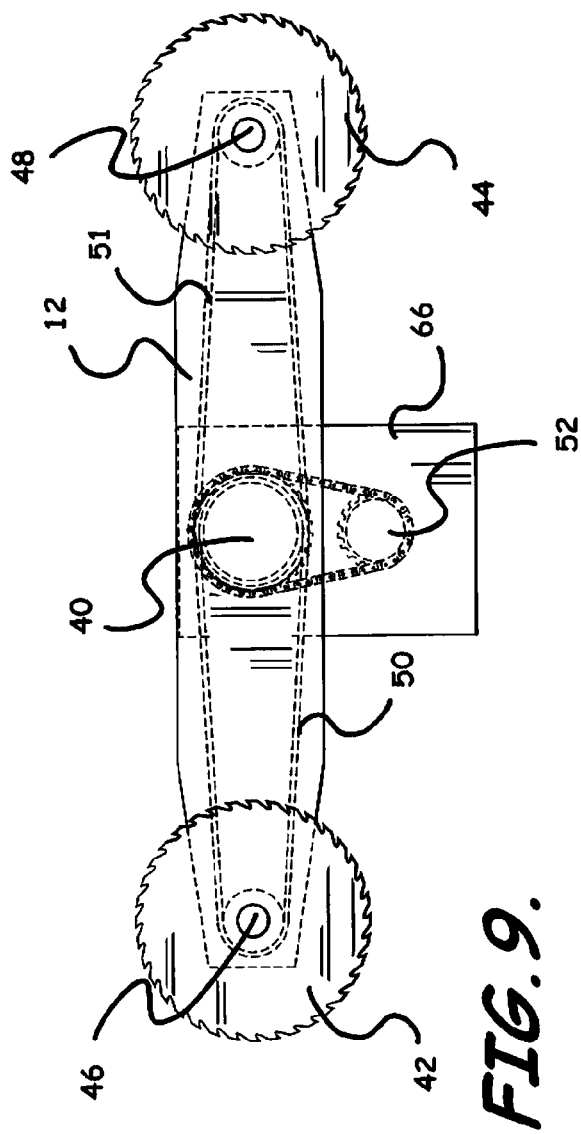
FIG. 9 is a top-down view of the swing arm and the swing arm motor showing how a chain or belt drive is used to rotate the swing arm about its point of connection according to an embodiment of the present invention.
Figure 10:
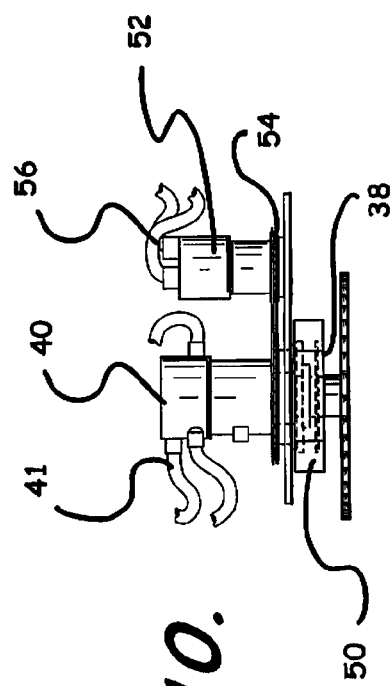
FIG. 10 is an edge-on view of the swing arm motor showing how a chain or belt drives used to rotate the circular saw blades are oriented about the point of connection within the swing arm according to an embodiment of the present invention.

Mounted to a lower side of the pivot plate 22 is a swing arm 12 having a lengthwise extent and two spaced apart ends 34, 36. The swing arm 12 is borne on a rotatable connection 38 to the lower side of the pivot plate 32 so that the swing arm may rotate through at least approximately 180° of arc relative to the connection 38, as depicted in FIG. 6. The rotation of the swing arm is driven by a swing arm motor 40 that uses hydraulic fluid connections 41 from the host vehicle to activate the motor, as shown in FIG. 7.

Figure 12:
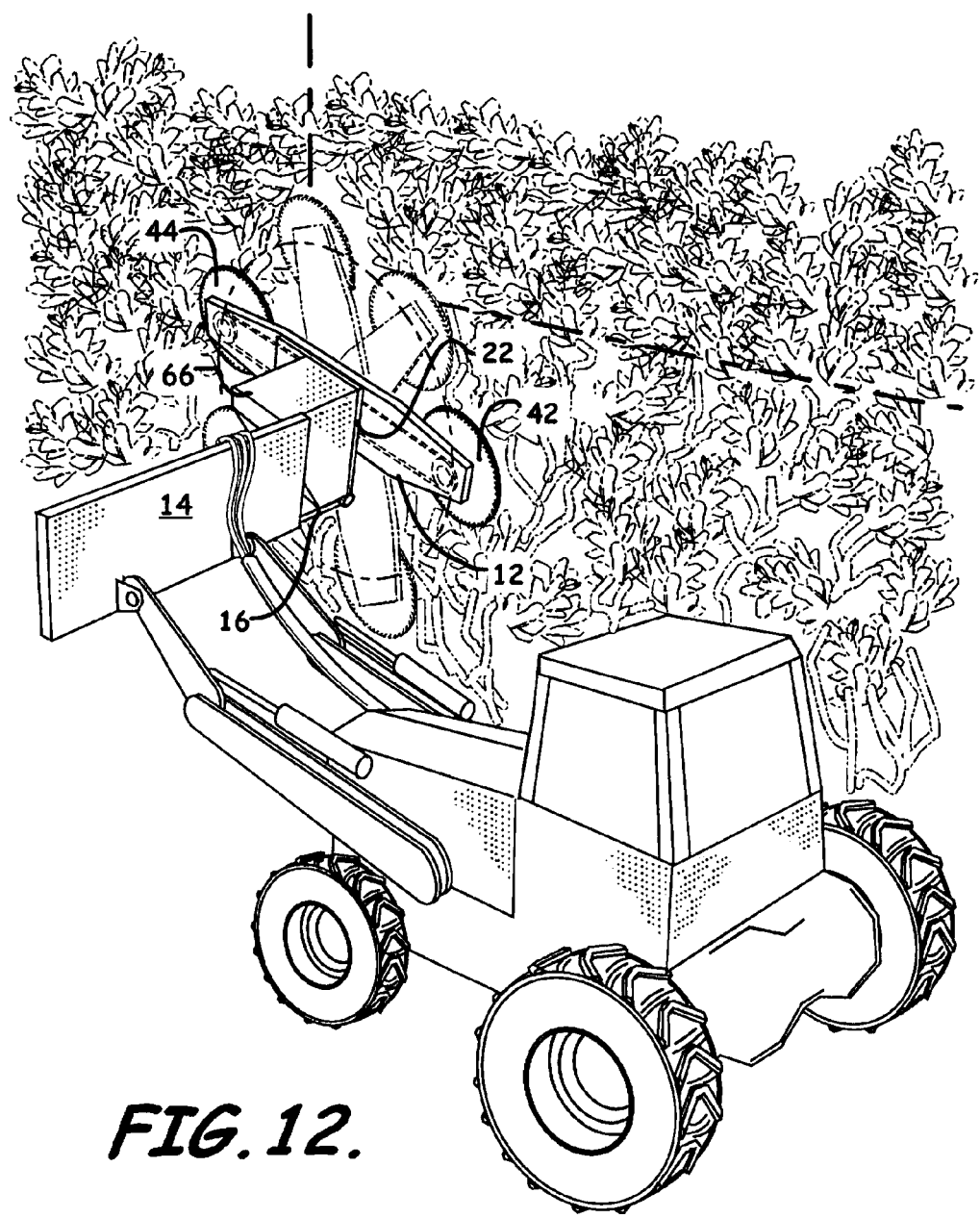
FIG. 12 is a view of the saw attachment of FIG. 1 mounted on a front-end loader and having the saw blades being rotated by the swing arm to trim the vertical side of a hedge.

Each of two circular saw blades 42, 44 is carried on its own individual rotatable connection 46, 48 located at each end 34, 36 of the swing arm 12. These saw blades 42, 44 are operated by at least one belt or chain drive 50, 51 located within the swing arm. Each belt 50, 51 is driven by a saw blade motor 52 mounted on the pivot plate 32 adjacent the swing arm motor 40. The compressive force is provided to the saw blade motor 52 via hydraulic fluid connections 56 from the host vehicle in a manner identical to the connections 41 of the swing arm motor 40 to the host vehicle. Each belt is attached about the rotatable connection 46, 48 at the ends 34, 36 of the swing arm 12 and in the center about a belt rotatable connection 58, such as gears, mounted adjacent the swing arm rotatable connection 38, as shown in FIG. 8. The saw blade motor 52 drives a linkage belt 54 attached between the saw blade motor 52 and the belt rotatable connection 58. The movement of the linkage belt 54 cause the belts 50, 51 mounted about the belt rotatable connection 58 and the individual saw rotatable connections 46, 48 to turn, causing each saw blade 42, 44 to spin about its own rotatable connection 46, 48. While this embodiment also shown in FIG. 12 represents that preferred by the inventor, those skilled in the art will recognize that for some applications in the related arts, multiple saw blades, and saw blades of different geometries may be desirable.

Figure 11:
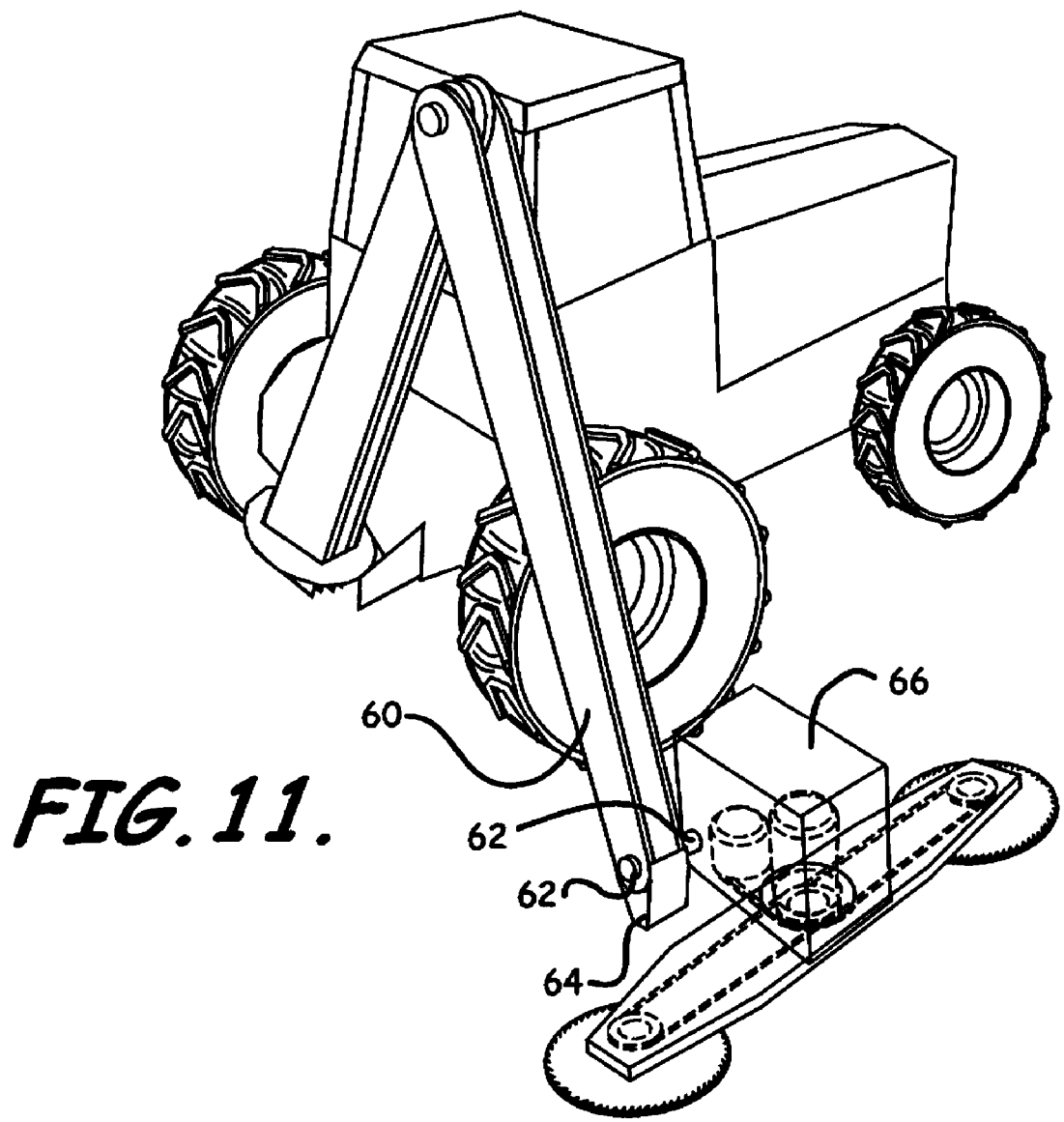
FIG. 11 is a view of an alternative embodiment showing back-hoe having an articulated arm attachment and illustrating how the motor and swing arm are oriented to a lateral point of connection thereon according to an embodiment of the present invention.

FIG. 11 depicts an alternative embodiment of the saw attachment 10 is attached to a back-hoe using an articulated arm attachment 60, rather than a connector plate 14 and an extension assembly 18, as discussed in the previous embodiment. FIG. 11 illustrates that the swing arm 12 is connected to the articulated arm 60 on a rotatable connection 62 that is positioned laterally to the longitudinal axis of the articulated hydraulic arm 60 near a terminal end of that arm 64. Absent in this embodiment is the connector plate 14, and the support plate 16. The functions of these components are instead performed by the articulated hydraulic arm 60, which can be used to set the orientation and height of the cutting blades mounted on the swing arm. The pivot plate 22 is replaced by a motor housing 66, which a box capable of holding the swing arm motor 40 and the saw blade motor 52 and their associated hydraulic connections 41 and 56, respectively. Operation of the swing arm 12, saw blades 42, 44, swing arm motor 40 and saw blade motor 56, and belts 50, 51, and linkage belt 54, remain unchanged from the previous embodiment.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A saw attachment for a vehicle capable of supporting hydraulic attachments, said saw attachment comprising:
    a connector plate connectable to a working end of the vehicle;
    a support plate extending outwardly from said connector plate along an imaginary plane approximately perpendicular thereto;
    a pivot plate pivotably connected along a lateral periphery of said support plate;
    a swing arm having a lengthwise extent and two spaced apart ends, said swing arm borne on said pivot plate on a rotatable connection so as to rotate relative to the connection;
    two saw blades, each connected adjacent an end of said swing arm;
    a hydraulically actuated motor supported on said pivot plate and connected to actuate the rotatable connection of said swing arm and said two saw blades;
    a first hydraulic cylinder operably connected between said support plate and said pivot plate to thereby pivotably actuate said pivot plate relative to said support plate; and
    an extension assembly slidably connecting said support plate to said connector plate, said extension assembly having at least one hydraulic cylinder actuator operable to slide said support plate laterally outward from the vehicle relative to said connector plate.

2. The saw attachment of claim 1, wherein said pivot plate is connected to said support plate by a hinge.

3. The saw attachment of claim 1, wherein the vehicle is an industrial or agricultural vehicle selected from a front-end loader, a backhoe, a tractor, a bulldozer, and a bobcat.

4. The saw attachment of claim 1, wherein said two saw blades are circular blades.

5. The saw attachment of claim 1, wherein the connection between said hydraulically actuated motor and said two circular saw blades is a belt.

6. The saw attachment of claim 1, wherein the connection between said hydraulically actuated motor and said two circular saw blades is a chain.

7. A saw attachment for a vehicle having a hydraulically operated arm, said saw attachment comprising:

a connector plate connectable to a working end of the hydraulically operated arm;

a support plate extending outwardly from said connector plate along an imaginary plane approximately perpendicular thereto;

a pivot plate pivotably connected along a lateral periphery of said support plate;

a swing arm having a lengthwise extent and two spaced apart ends, said swing arm borne on said pivot plate on a rotatable connection so as to rotate relative to the connection;

two saw blades, each connected adjacent an end of said swing arm;

a hydraulically actuated motor supported on said pivot plate and connected to actuate the rotatable connection of said swing arm and said two saw blades;

a first hydraulic cylinder operably connected between said support plate and said pivot plate to thereby pivotably actuate said pivot plate relative to said support plate; and an extension assembly slidably connecting said support plate to said connector plate, said extension assembly having at least one hydraulic cylinder actuator operable to slide said support plate laterally outward from the hydraulically operated arm relative to said connector plate.

8. The saw attachment of claim 7, wherein said pivot plate is connected to said support plate by a hinge.

9. The saw attachment of claim 7, wherein the connection between said hydraulically actuated motor and said two circular saw blades is a belt.

10. The saw attachment of claim 7, wherein the connection between said hydraulically actuated motor and said two circular saw blades is a chain.

11. The apparatus of claim 7, wherein said one or more cutting members are selected from a chainsaw and a circular saw blade.

* * * * *